(12) United States Patent
Zhuang et al.

(10) Patent No.: US 12,526,228 B2
(45) Date of Patent: Jan. 13, 2026

(54) ROUTE MANAGEMENT METHOD, APPARATUS, AND SYSTEM

(71) Applicant: Huawei Technologies Co., Ltd., Shenzhen (CN)

(72) Inventors: Shunwan Zhuang, Beijing (CN); Haibo Wang, Beijing (CN); Yunan Gu, Beijing (CN); Zhongqi Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 385 days.

(21) Appl. No.: 18/157,581

(22) Filed: Jan. 20, 2023

(65) Prior Publication Data

US 2023/0155927 A1    May 18, 2023

Related U.S. Application Data

(63) Continuation of application No. PCT/CN2021/106689, filed on Jul. 16, 2021.

(30) Foreign Application Priority Data

Jul. 21, 2020  (CN) .......................... 202010706089.9
Sep. 11, 2020  (CN) .......................... 202010954759.9

(51) Int. Cl.
*H04L 45/302* (2022.01)
*H04L 45/02* (2022.01)

(52) U.S. Cl.
CPC ............ *H04L 45/306* (2013.01); *H04L 45/04* (2013.01)

(58) Field of Classification Search
CPC ........ H04L 45/306; H04L 45/04; H04L 63/12; H04L 63/1466; H04L 45/02; H04W 12/102
See application file for complete search history.

(56) References Cited

U.S. PATENT DOCUMENTS

| 8,996,723 B2 | 3/2015 | Li et al. |
| 9,198,203 B2 | 11/2015 | Shaffer et al. |
| 2009/0141637 A1 | 6/2009 | Bauer et al. |

(Continued)

FOREIGN PATENT DOCUMENTS

| CN | 101681341 A | 3/2010 |
| CN | 103210669 A | 7/2013 |

OTHER PUBLICATIONS

Bush, R. et al., "The Resource Public Key Infrastructure (RPKI) to Router Protocol," Version 1, Internet Engineering Task Force (IETF), Request for Comments: 8210, Updates: 6810, Category: Standards Track, ISSN: 2070-1721, Dragon Research Labs, Sep. 2017, 35 pages.

(Continued)

*Primary Examiner* — Yaotang Wang
(74) *Attorney, Agent, or Firm* — Slater Matsil, LLP

(57) ABSTRACT

A route management and autonomous system (AS) management system and method. The method includes obtaining a correspondence, where the correspondence comprises a first autonomous system (AS) identifier and a second AS identifier, and where the correspondence indicates that the first AS identifier and the second AS identifier are sibling ASes, and performing route management based on the correspondence.

20 Claims, 7 Drawing Sheets

| 0 | 8 | 16 | 24 | 31 |
|---|---|---|---|---|
| Protocol Version | PDU Type | Zero1 | | |
| Length | | | | |
| Flag | Zero2 | Sibling AS Count | | |
| Organization Identifier | | | | |
| Sibling AS Number(s) | | | | |

(56) References Cited

U.S. PATENT DOCUMENTS

| | | | |
|---|---|---|---|
| 2015/0207728 A1* | 7/2015 | Gagliano | H04L 41/12 |
| | | | 370/254 |
| 2017/0041332 A1 | 2/2017 | Mahjoub et al. | |
| 2019/0109780 A1* | 4/2019 | Nagarkar | H04L 45/247 |
| 2020/0235992 A1* | 7/2020 | Harneja | H04L 41/0873 |
| 2021/0105297 A1* | 4/2021 | Beck | H04L 63/0236 |
| 2021/0135982 A1 | 5/2021 | Chaturmohta et al. | |

OTHER PUBLICATIONS

Liang, H. et al., "Method of Inspecting MP-BGP Misconfiguration in BGP/MPLS VPN," Computer Engineering, vol. 32, No. 5, Mar. 2006, 4 pages.

Wang, H. et al., "BGP Invalid Route Detection Method," Journal of Jilin Normal University (Natural Science Edition), Issue 3, Aug. 2008, 11 pages (with English Translation).

Xiubin, Z. et al., "The Heuristic Algorithms for Inferring Autonomous System Relationships on the Internet," The Network Centre of China University of Geosciences, Wuhan, 2003, 3 pages (with English Abstract).

Su Shen et al: "Towards real-time route leak events detection", 2015 IEEE International Conference on Communications (ICC), IEEE, Jun. 8, 2015 (Jun. 8, 2015), pp. 7192-7197, XP033199617.

Azimov Yandex E Bogomazov Qrator Labs R Bush Internet Initiative Japan and Arrcus K Patel Arrcus A et al: "Verification of AS—PATH Using the Resource Certificate Public Key Infrastructure and Autonomous System Provider Authorization; draft -ietf-sidrops-aspa-verification-04. txt", Verification of as Path Using the Resource Certificate Public Key Infrastructure and Autonomous System Provider Authorization; draft-ietf-sidrops-aspa-verification-04.txt; Internet-Draft.

\* cited by examiner

300

Obtain a correspondence, including a first autonomous system AS identifier and a second AS identifier, and indicating that the first AS identifier and the second AS identifier are sibling ASes — S303

Perform route management based on the correspondence — S305

ROUTE MANAGEMENT METHOD, APPARATUS, AND SYSTEM

CROSS-REFERENCE TO RELATED APPLICATIONS

This application is a continuation of International Application No. PCT/CN2021/106689, filed on Jul. 16, 2021, which claims priority to Chinese Patent Application No. 202010706089.9, filed on Jul. 21, 2020 and Chinese Patent Application No. 202010954759.9, filed on Sep. 11, 2020. All of the aforementioned patent applications are hereby incorporated by reference in their entireties.

TECHNICAL FIELD

This application relates to the communication field, and provides a route management method, an apparatus, and a system.

BACKGROUND

In a current autonomous system (AS) management solution, an AS, a business announcement relationship between ASes, or original route information of a route is usually managed. However, these management methods have problems such as incomplete information.

SUMMARY

Embodiments of this application provide a route management method, an apparatus, and a system, to reduce a problem such as incomplete information.

The technical solutions are as follows.

According to a first aspect, a route management method is provided. The method includes obtaining a correspondence, where the correspondence includes a first AS identifier and a second AS identifier, and the correspondence indicates that the first AS identifier and the second AS identifier are sibling ASes, and performing route management based on the correspondence.

In the route management, information indicating that the first AS identifier and the second AS identifier are the sibling ASes is considered, so that information for the route management is more comprehensive.

In a possible design, the performing route management based on the correspondence includes determining that a route message is valid based on the correspondence.

In a process of determining whether the route message is valid, information about the sibling ASes is considered, so that a problem of misjudgment is reduced, and accuracy of a result of determining the route message is further improved.

In a possible design, before the determining that a route message is valid based on the correspondence, the method further includes determining that the route message is invalid based on route origination authorization (ROA) information, where that the route message is invalid herein includes a route of the route message is hijacked, or determining that the route message is invalid based on business relationship information, where that the route message is invalid herein includes route leakage occurs on the route message.

Through combining existing ROA or business relationship information, a route message that may be originally misjudged as invalid may be determined as valid, and the accuracy of the result of determining the route message becomes higher.

In a possible design, the route message includes a first route prefix and a third AS identifier, and the route message indicates that a third AS is an origin AS of the first route prefix. The determining that the route message is invalid based on ROA information includes determining, based on the ROA information, that the first route prefix is hijacked by the third AS, where the ROA information indicates that an origin AS of a second route prefix is a second AS, and the first route prefix corresponds to the second route prefix. The determining that a route message is valid based on the correspondence includes when the third AS identifier is the same as the first AS identifier, determining that the route message is not hijacked by the third AS identifier.

Through combining the existing ROA information, a route message that may be originally misjudged as a route message on which route hijacking occurs may be determined as valid, and the accuracy of the result of determining the route message becomes higher.

In a possible design, the route message includes a first route prefix, a third AS identifier, and a fourth AS identifier, and the third AS identifier is adjacent to the fourth AS identifier on an AS path of the route message. The determining that the route message is invalid based on business relationship information includes validating that the first route prefix is leaked by a third AS to a fourth AS. The determining that a route message is valid based on the correspondence includes determining, based on that the fourth AS identifier is the same as the first AS identifier and that a first condition is met, that the route message is not leaked by the third AS, where the first condition includes the third AS identifier is the same as the second AS identifier, or an origin AS identifier (ID) included in the route message is the same as the second AS identifier. The origin AS ID may be the fourth AS, or may be another AS.

Through combining the existing ROA information, a route message that may be originally misjudged as a route message on which route leakage occurs may be determined as valid, and the accuracy of the result of determining the route message becomes higher.

In a possible design, after determining that the route message is valid, the method further includes updating a validation status corresponding to the route message to valid.

After the validation status of the route message is updated to valid, the route message does not need to be validated for a plurality of times, to reduce a possibility that another device or another functional module performs validation again or performs misjudgment again.

In a possible design, the obtaining a correspondence includes receiving a first message, where the first message includes the correspondence.

The correspondence may be obtained in a manner in which the foregoing correspondence management is directly carried in a received message, to reduce local processing pressure.

In a possible design, the first message is sent by a resource public key infrastructure (RPM) server, the first message includes a sibling AS protocol data unit (PDU), and the PDU includes the first AS identifier and the second AS identifier.

In a possible design, the first message further includes an organization identifier and/or a sibling AS count.

Through receiving a message sent by the RPKI server, the technical solution is integrated into an existing system, and practicability of the technical solution is further improved.

Through defining a format of a message directly exchanged with the RPKI server, difficulty in applying the technical solution can be further reduced.

In a possible design, the route message is a border gateway protocol (BGP) message.

In a possible design, the performing route management based on the correspondence includes sending a message to a receiving device, where the message includes the correspondence, and the message is used by the receiving device to perform route analysis based on the correspondence.

Indirect route management is performed through sending the correspondence indicating the sibling ASes, so that information obtained when a device that receives the correspondence performs route management is more comprehensive.

In a possible design, the obtaining a correspondence includes obtaining the first AS identifier and the second AS identifier, determining that the first AS identifier and the second AS identifier are the sibling ASes, and generating the correspondence.

The sibling ASes are determined based on the obtained first AS identifier and the obtained second AS identifier, and the correspondence is generated, so that a more intelligent solution is provided.

In a possible design, technologies in the first aspect and the various possible designs of the first aspect are applied to a RPKI system.

Through integrating the technical solution into the existing RPKI system, the practicability of the technical solution can be further improved.

According to a second aspect, a route management method is provided. The method includes obtaining a first AS identifier and a second AS identifier, and sending a message, where the message includes the first AS identifier and the second AS identifier, and the message indicates that the first AS identifier and the second AS identifier are sibling ASes.

In a possible design, the message further includes an organization identifier and/or an AS count.

In a possible design, the first AS identifier and the second AS identifier are carried in a sibling AS PDU in the message.

Indirect route management is performed through sending a correspondence indicating the sibling ASes, so that information obtained when a device that receives the correspondence performs route management is more comprehensive.

According to a third aspect, a route management apparatus is provided, and includes a processing unit. The processing unit is configured to obtain a correspondence, where the correspondence includes a first AS identifier and a second AS identifier, and the correspondence indicates that the first AS identifier and the second AS identifier are sibling ASes. The processing unit is further configured to perform route management based on the correspondence.

In a possible design, the processing unit is configured to determine that a route message is valid based on the correspondence.

In a possible design, before the processing unit is configured to determine that the route message is valid, the processing unit is further configured to determine that the route message is invalid based on ROA information, where that the route message is invalid includes a route of the route message is hijacked, or determine that the route message is invalid based on business relationship information, where that the route message is invalid includes route leakage occurs on the route message.

In a possible design, the route message includes a first route prefix and a third AS identifier, and the route message indicates that a third AS is an origin AS of the first route prefix. The processing unit is configured to determine, based on the ROA information, that the first route prefix is hijacked by the third AS, where the ROA information indicates that an origin AS of a second route prefix is a second AS, and the first route prefix corresponds to the second route prefix. The processing unit is further configured to when the third AS identifier is the same as the first AS identifier, determine that the route message is not hijacked by the third AS identifier.

In a possible design, the route message includes a first route prefix, a third AS identifier, and a fourth AS identifier, and the third AS identifier is adjacent to the fourth AS identifier on an AS path of the route message. The processing unit is configured to determine that the first route prefix is leaked by a third AS to a fourth AS. The processing unit is further configured to determine, based on that the fourth AS identifier is the same as the first AS identifier and that a first condition is met, that the route message is not leaked by the third AS, where the first condition includes the third AS identifier is the same as the second AS identifier, or an origin AS identifier included in the route message is the same as the second AS identifier.

In a possible design, the processing unit is further configured to update a determining status corresponding to the route message to valid.

In a possible design, the route management apparatus further includes a receiving unit, where the receiving unit is configured to receive a first message, and the first message includes the correspondence.

In a possible design, the route management apparatus further includes a sending unit, configured to send a message to a receiving device, where the message includes the correspondence, and the message is used by the receiving device to perform route analysis based on the correspondence.

In a possible design, the processing unit is further configured to obtain the first AS identifier and the second AS identifier, determine that the first AS identifier and the second AS identifier are the sibling ASes, and generate the correspondence.

According to a fourth aspect, an AS management apparatus is provided, where the apparatus includes a processing unit and a sending unit. The processing unit is configured to obtain a first AS identifier and a second AS identifier. The sending unit is configured to send a message, where the message includes the first AS identifier and the second AS identifier, and the message indicates that the first AS identifier and the second AS identifier are sibling ASes.

In a possible design, the message further includes an organization identifier and/or an AS count.

In a possible design, the first AS identifier and the second AS identifier are carried in a sibling AS PDU in the message.

According to a fifth aspect, a route management device is provided. The route management device includes a processor and a communication interface. The processor is configured to execute instructions, so that the route management device performs the method according to any one of the first aspect or the optional manners of the first aspect. The communication interface is configured to receive or send a packet. For specific details of the route management device provided in the fifth aspect, refer to any one of the first aspect or the optional manners of the first aspect. Details are not described herein again.

According to a sixth aspect, an AS management device is provided. The AS management device includes a processor and a communication interface. The processor is configured to execute instructions, so that the AS management device performs the method according to any one of the second aspect or the optional manners of the second aspect. The communication interface is configured to receive or send a packet. For specific details of the AS management device provided in the sixth aspect, refer to any one of the second aspect or the optional manners of the second aspect. Details are not described herein again.

According to a seventh aspect, a computer-readable storage medium is provided. The storage medium stores at least one instruction, and the instruction is read by a processor, so that a route management device performs the method according to any one of the first aspect or the optional manners of the first aspect.

According to an eighth aspect, a computer-readable storage medium is provided. The storage medium stores at least one instruction, and the instruction is read by a processor, so that an AS management device performs the method according to any one of the second aspect or the optional manners of the second aspect.

According to a ninth aspect, a computer program product is provided. The computer program product includes computer instructions, and the computer instructions are stored in a computer-readable storage medium. A processor of a route management device reads the computer instructions from the computer-readable storage medium, and the processor executes the computer instructions, so that the route management device performs the method according to any one of the first aspect or the optional manners of the first aspect.

According to a tenth aspect, a computer program product is provided. The computer program product includes computer instructions, and the computer instructions are stored in a computer-readable storage medium. A processor of an AS management device reads the computer instructions from the computer-readable storage medium, and the processor executes the computer instructions, so that the AS management device performs the method according to any one of the second aspect or the optional manners of the second aspect.

According to an eleventh aspect, a chip is provided. When the chip runs on a route management device, the route management device performs the method according to any one of the first aspect or the optional manners of the first aspect.

According to a twelfth aspect, a chip is provided. When the chip runs on an AS management device, the AS management device performs the method according to any one of the second aspect or the optional manners of the second aspect.

According to a thirteenth aspect, a route management device is provided. The route management device includes a main control board and an interface board, and may further include a switching board. The route management device is configured to perform the method according to any one of the first aspect or the possible implementations of the first aspect. Specifically, the route management device includes a unit configured to perform the method according to any one of the first aspect or the possible implementations of the first aspect.

According to a fourteenth aspect, an AS management device is provided. The AS management device includes a main control board and an interface board, and may further include a switching board. The AS management device is configured to perform the method according to any one of the second aspect or the possible implementations of the second aspect. Specifically, the AS management device includes a unit configured to perform the method according to any one of the second aspect or the possible implementations of the second aspect.

According to a fifteenth aspect, a communication system is provided. The communication system includes a route management device and/or an AS management device. For example, the communication system includes the route management device in any one of the third aspect, the fifth aspect, and the thirteenth aspect, or the communication system includes the AS management device in any one of the fourth aspect, the sixth aspect, and the fourteenth aspect.

DETAILED DESCRIPTION OF ILLUSTRATIVE EMBODIMENTS

Figure 1:
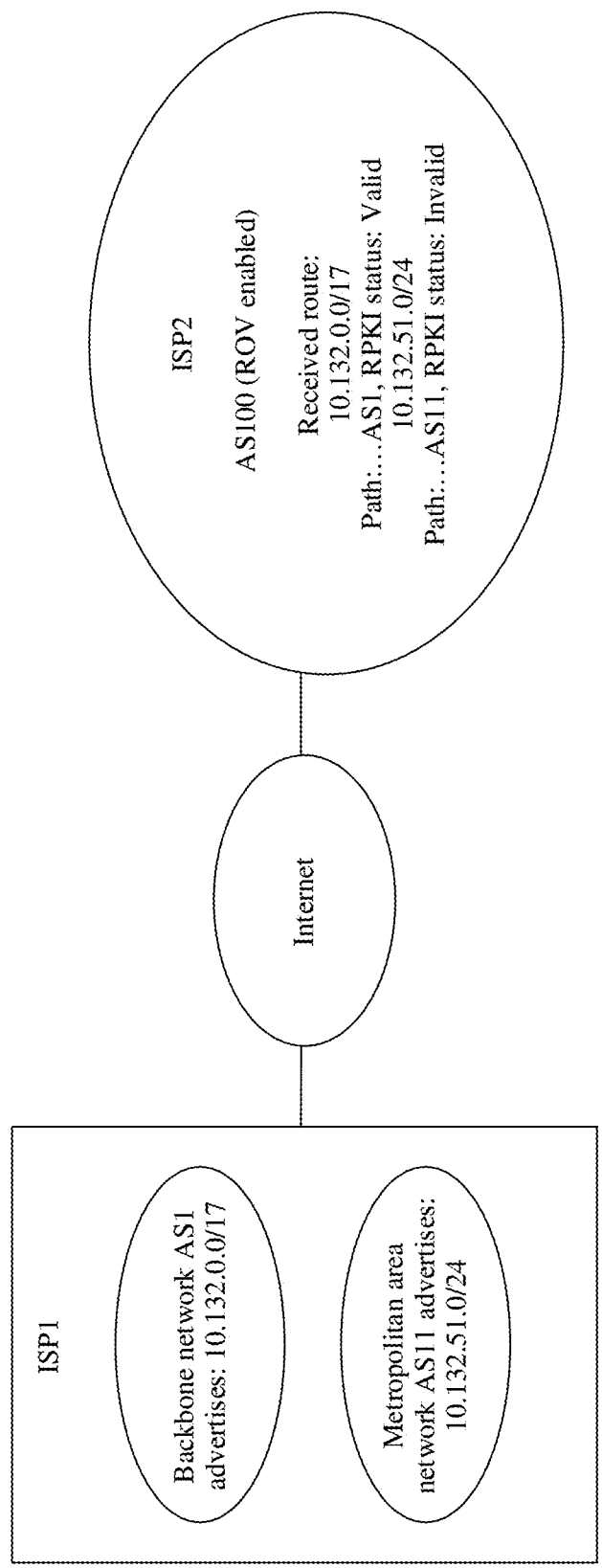
FIG. 1 is a schematic diagram of a route hijacking misjudgment scenario according to an embodiment of this application.

Terms used in implementations of this application are only used to explain specific embodiments of this application, but are not intended to limit this application.

In this application, terms such as "first", "second", and "third" are used to distinguish between same items or similar items that have basically same purposes or functions. It should be understood that there is no logical or time sequence dependency between "first", "second", and "third", and a quantity and an execution sequence are not limited.

The following describes terms used in this application.

Sibling autonomous system (AS): Two or more ASes managed or operated by a single organization or different organizations may be referred to as sibling ASes. The organization may include an operator, a network group, an Internet service provider (ISP), a company, and the like. The following describes the sibling ASes by using examples.

1. Organization A has two subsidiary organizations. Two or more ASes managed or operated by the two subsidiary organizations can be sibling ASes.

2. Organization A is responsible for operating networks for organizations B and C, where the two organizations have different AS identifiers. In some cases, for example, with consent from organizations B and C, ASes that belong to organizations B and C and that are operated by organization A can be considered as sibling ASes.

3. Organization A and organization B respectively have and manage different networks, and correspond to different AS identifiers. In some cases, for example, with consent from organizations A and B, the AS identifiers corresponding to organizations A and B can also be considered as sibling ASes.

Origin AS: A route announcement message or route information usually includes a route prefix and AS path information. The AS path information may be carried in a corresponding BGP attribute. An AS path includes an origin AS identifier. In an example, the $1^{st}$ AS identifier from the last on the AS path may be considered as an origin AS of the route prefix, that is, it indicates that the route prefix is advertised by the origin AS. In an example, the $1^{st}$ AS identifier from the last on the AS path may usually be the rightmost AS on the AS path. For example, when the AS path is (123 456 567), 567 can be considered as the origin AS. For example, when the AS path is (ABC ABC DEF DEF GHI GHI), GHI can be considered as the origin AS.

Neighboring AS: On an AS path of a route message, if two AS identifiers are in a sequential order, it may be considered that the two AS identifiers are adjacent. For example, when an AS path is (123 456 567), it may be considered that 123 is adjacent to 456, 456 is adjacent to 123 and 567, and 567 is adjacent to 456. For example, when an AS path is (ABC ABC DEF DEF GHI GHI), it may be considered that ABC is adjacent to DEF, DEF is adjacent to ABC and GHI, and GHI is adjacent to DEF.

Route hijacking: In a route announcement process, AS path information of a corresponding route in a route announcement packet, namely, a route message, may be changed. When an origin AS identifier ID of the route is changed to another ID value by another AS domain or device that the route passes through, it may be considered that route hijacking occurs, to be specific, the route is hijacked by a changed origin AS. For related content of the route hijacking, refer to detailed descriptions in the following related technology part.

Route leakage: In an AS neighbor business relationship, a rule for advertising route information is specified. Once content of at least two AS identifiers included on an AS path of a route does not comply with the rule for advertising route information, it is considered that route leakage may occur. For related content of the route leakage, refer to detailed descriptions in the following related technology part.

The following briefly describes related technologies in embodiments of this application.

Current Internet infrastructure mainly includes inter-domain route systems, such as a border gateway protocol (BGP), a domain name system (DNS), and a public key certificate system, such as public key infrastructure (PKI). Almost all Internet services rely on infrastructure to ensure network connectivity, service availability, and service trustworthiness.

In this architecture, BGP route-based security attacks occur every day, and tens of thousands of attacks, such as origin hijacking, path hijacking, and route leakage, occur every year. The BGP does not have a security authentication mechanism for route learning. Therefore, to resolve a problem of BGP route hijacking, the industry provides a solution, namely, resource public key infrastructure (RPKI), for validating whether an origin of a BGP route is correct. A distributed RPKI server is used to collect information such as an origin AS identifier, a route prefix, and a mask of a BGP route initiated by an Internet service provider (ISP). A router establishes a connection with the RPM server and locally stores a copy of route origination authorization (ROA) data for validating whether a BGP prefix received from an external neighbor is valid. This ensures that a host in a management domain of the router can securely access an external service.

The following describes a route hijacking misjudgment scenario.

A router receives a BGP route update packet from an external BGP neighbor. Before adding a route in the packet to a BGP route table, the router validates whether an origin AS is correct based on a route prefix and an AS identifier. Then, the router may adjust a route attribute based on a validation result, which affects a BGP route selection result. If the validation result of the route is valid, the router may advertise a preferred route and the validation result to an internal neighbor via a BGP route according to an extended community attribute defined in a standard. If the validation result of the route is invalid, it may be considered that the route is hijacked. In this case, the route is to be discarded or a priority of the route is to be lowered.

The following uses an example to describe a route hijacking misjudgment case. FIG. 1 is a schematic diagram of a route hijacking misjudgment scenario according to an embodiment of this application. As shown in FIG. 1, ISP1 has two networks. An AS identifier of a backbone network is AS1, and an AS identifier of a metropolitan area network is AS11. In some cases, the backbone network advertises a route prefix (for example, 10.132.0.0/17) including a large address block, and arranges a subnet of the ISP, such as the metropolitan area network, to advertise a sub-route prefix of the route prefix. For example, 10.132.51.0/24 is assigned to the metropolitan area network.

ISP1 issues, for AS1, ROA: 10.132.0.07-17, AS1. The ROA can be understood as: A route prefix is 10.132.0.0, a mask is 17, an allowed maximum mask length is 17, and an origin AS is AS1. ISP does not issue ROA, for example, 10.132.51.0/24, for the subnet. Table 1 shows issued ROA information.

TABLE 1

| | AS | Prefix (Prefix)/Mask (Mask) | Issued ROA |
| --- | --- | --- | --- |
| Backbone network | AS1 | 10.132.0.0/17 | 10.132.0.0/17-17, AS1 |
| Subnet 1 | AS11 | 10.132.51.0/24 | Not issued |

After the backbone network AS1 and subnet 1, namely, AS11, respectively advertise route prefixes in the network, these route prefixes are received by using route messages by each network, for example, a network of ISP2 whose AS identifier is AS2, connected to the Internet.

After receiving the route messages corresponding to the two route prefixes, a device in an ROA-enabled network, for example, AS2 in the network of ISP2, performs origin validation on the received route messages.

Route message 1 includes route prefix 10.132.0.0/17, where an AS path included in the route message is, for example, (AS11 AS1), indicating that an origin AS corresponding to route prefix 10.132.0.0/17 is AS1. In this case, the device may use (AS1, 10.132.0.0/17) to query an ROA database. An ROA entry 10.132.0.07-17, AS1 is matched. Therefore, the validation result is valid (Valid).

Route message 2 includes route prefix 10.132.51.0/24, where an AS path included in the route message is, for example, (AS2 AS11), indicating that an origin AS corresponding to route prefix 10.132.51.0/24 is AS11. In this case, the device may use (AS11, 10.132.51.0/24) to query the ROA database. No ROA entry is matched. Therefore, the validation result is invalid (Invalid), indicating that route hijacking occurs.

In this case, the backbone network AS1 and the metropolitan area network AS11 belong to a same company, but there is a problem with internet protocol (IP) address space allocation and ROA registration. As a result, it is determined that "route hijacking" occurs on the route prefix advertised by the metropolitan area network. Actually, the route hijacking is "fake route hijacking", which may cause serious network connectivity problems.

The following describes a route leakage misjudgment scenario.

Based on a principle of maximizing commercial benefits, route advertisement policy rules in an ISP network are as follows.
1) A route announced by a customer AS can be transferred to a customer, a peer, and a provider.
2) A route announced by a peer AS can be transferred to a customer, but cannot be announced to another peer or provider.
3) A route announced by a provider AS can be transferred to a customer, but cannot be announced to another peer or provider.

If the foregoing route advertisement policy is violated, it may be considered that route leakage occurs. In related technologies, it may be misjudged that route leakage occurs on a route transmitted between different ASes of a same company. For example, provider A purchases a service from provider B. For example, a route prefix of a route message announced by company B to A is 10.132.51.0/24, and a value of an AS path (Path) of the route message is (AS1 AS11 AS2). AS2 is an origin AS of the route prefix, indicating that a route is announced by AS2 to AS11, and then announced to AS1 via AS11. AS2 is an AS of company B, and AS11 is an AS identifier of provider A. When performing route analysis based on a business relationship, a network device or a route analysis system considers that a route announced by provider B can be transferred to provider A but cannot be announced to another peer and provider. Therefore, it is determined that the route prefix is leaked to AS1 by AS11. However, in this example, AS1 is also an AS identifier of another network of provider A. In this case, it is determined (where "determined" herein may also be referred to as "validated") that route leakage occurs on the route, which violates the route announcement rule, and may cause serious network connectivity problems.

Embodiments of this application provide a technical solution for AS management. Through constructing sibling AS information, comprehensiveness of information for an AS management solution is improved, and a problem such as route leakage/route hijacking misjudgment is further avoided. In the technical solution, when a device processes route (route hijacking or route leakage) analysis, a sibling AS dataset is used as one of key factors to be considered, to improve analysis accuracy.

Figures 2, 3A:
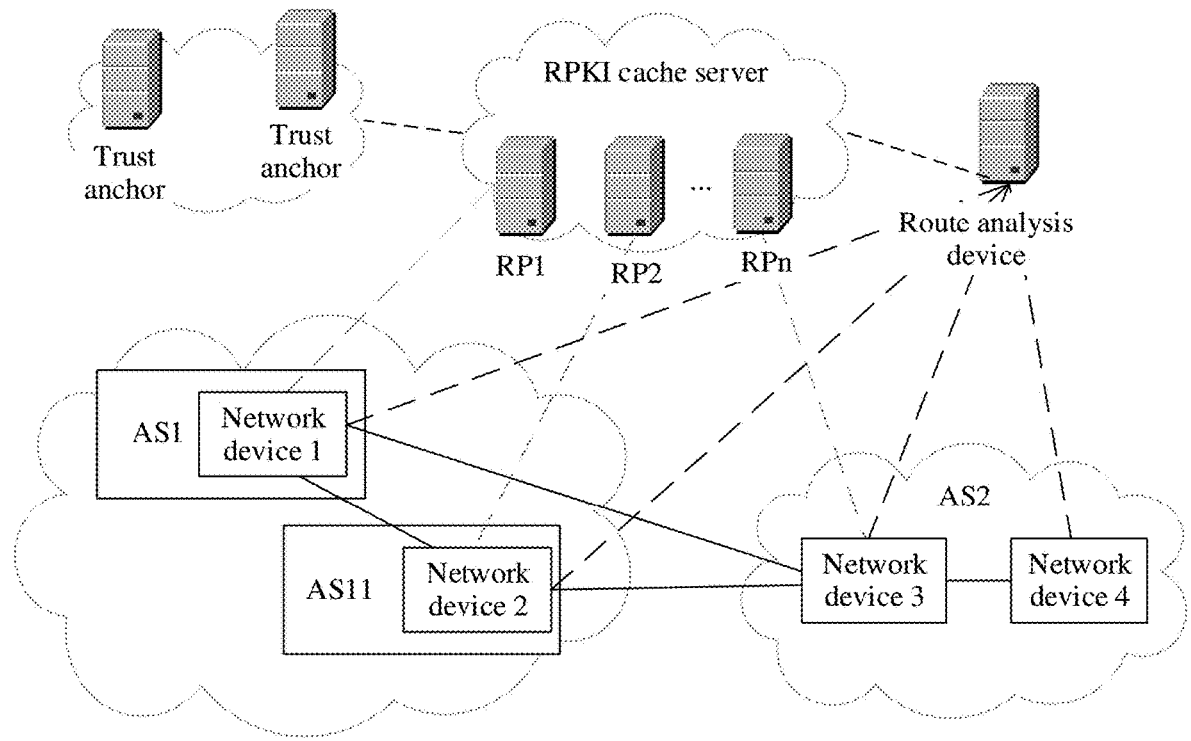
FIG. 2 is a schematic diagram of a network system according to an embodiment of this application.
FIG. 3a is a schematic diagram of a route management method according to an embodiment of this application.

FIG. 2 is a schematic diagram of a network scenario according to this application. The network scenario includes three ASes: AS1, AS11, and AS2. AS1 and AS11 belong to a same ISP, in other words, AS1 and AS2 are sibling ASes. AS1 includes network device 1, AS11 includes network device 2, and AS2 includes network device 3 and network device 4. Network device 1 is connected to network device 2 and network device 3. Network device 2 is connected to network device 1 and network device 3. Network device 3 is connected to network device 1, network device 2, and network device 4. Network device 1 and network device 2 may be considered as external border gateway protocol peers of network device 3, where the peer may also be referred to as a neighbor. Network device 4 and network device 3 may be internal border gateway protocol (IBGP) peers. In the foregoing, network device 1, network device 2, network device 3, and network device 4 may be a router, a switch, or any other physical or virtual network device that supports a routing function. The network may further include more ASes or more network devices, which are not shown one by one herein. Optionally, the network may further include an RPKI cache server. The RPKI server may also be referred to as an RP server, for example, RP1, RP2, or RPn. Network device 1, network device 2, or network device 3 may obtain ROA information from a connected RPKI cache server, to validate whether a BGP route message obtained by network device 1, network device 2, or network device 3 is valid. In FIG. 2, a deployment location of the RPKI cache server is merely an example, and the RPKI cache server may be deployed by the ISP. Optionally, the network may further include a route analysis device, where the route analysis device includes any one or more of a controller, a network management device, or a centralized route analysis device. The route analysis device may be a device such as a server or a router that has a route analysis function, and may be a specific entity device or a virtual device. The route analysis device may perform route analysis based on route information including a route and an AS path and AS information including an AS identifier that are obtained from a network device or any other place (for example, from an administrator who inputs or imports route information or from another system). Optionally, the network may further include a trust anchor (TA). The TA may synchronize information with the RP server, so that the RP can obtain various AS-related information from the TA.

The foregoing briefly describes the related technologies in embodiments of this application, and the following describes method embodiments of this application by using examples. FIG. 3a is a flowchart of a route management method according to an embodiment of this application. A method embodiment 300 shown in FIG. 3a includes the following steps.

S303: Obtain a correspondence, where the correspondence includes a first AS identifier and a second AS identifier, and the correspondence indicates that the first AS identifier and the second AS identifier are sibling ASes.

In an example, after obtaining the first AS identifier and the second AS identifier, a device may determine that the first AS identifier and the second AS identifier are the sibling ASes, and generate the correspondence, where the correspondence includes the first AS identifier and the second AS identifier, and the correspondence indicates that the first AS identifier and the second AS identifier are the sibling ASes.

In another example, a device may alternatively receive a message sent by another device, where the message includes the first AS identifier and the second AS identifier, and the message indicates that the first AS identifier and the second AS identifier are the sibling ASes. That is, herein, receiving the message by the device may be considered as receiving the foregoing correspondence. The device may store the correspondence after receiving the message. Alternatively, the device may immediately use the correspondence after receiving the message.

The device in the foregoing two examples may include a route management device.

With reference to the scenario shown in FIG. 2, the following describes an example of the step in which the device obtains the correspondence. This step may include but is not limited to the following four cases.

Case 1: A TA of a regional Internet registry (RIR) obtains a first AS identifier and a second AS identifier.

In an example, the process is as follows. Each organization that has an AS identifier reports AS data information of the organization to an RIR to which the organization belongs. In an example, the information reported by the organization includes an organization identifier and a sibling AS list. The sibling AS list includes a plurality of AS identifiers managed by the organization, that is, includes the first AS identifier and the second AS identifier.

In another example, after allocating an AS to the organization, the RIR may alternatively store the first AS identifier and the second AS identifier information in the TA, to generate the foregoing correspondence.

Case 2: An RP server obtains a first AS identifier and a second AS identifier.

Manners of obtaining the first AS identifier and the second AS identifier by the RP server include but are not limited to the following two manners.

Manner 1: The RP server or an administrator corresponding to the RP server generates one or more pieces of AS information having a sibling relationship by analyzing a global Internet route table and various Internet public data, where the AS information includes the first AS identifier and the second AS identifier. For example, in the Internet route table, prefixes of two routes are almost the same, a difference between quantities of corresponding mask bits is only 2, and corresponding origin ASes are respectively AS1 and AS2. In this case, the RP server may determine, based on the route table, that AS1 and AS2 are sibling ASes. For example, if the Internet discloses that a company has AS1 and a subsidiary of the company has AS2, the RP server may determine, based on the information, that AS1 and AS2 are sibling ASes. If the first AS identifier and the second AS identifier are obtained by the administrator through analysis, the administrator may configure the first AS identifier and the second AS identifier on the RP server in a configuration manner. That is, the RP server may obtain the first AS identifier and the second AS identifier through analysis or manual configuration. When the RP server performs analysis, related program code may be preconfigured on the RP server to obtain the foregoing correspondence through analysis.

Manner 2: The RP server may be connected to one or more TA servers, and obtain the first AS identifier and the second AS identifier that are sent by each TA server. In an example, the TA may send the first AS identifier and the second AS identifier by sending a certificate. To be specific, the RP server may obtain the first AS identifier and the second AS identifier from the certificate sent by the TA, and generate a sibling AS relationship based on information including same organization information or information indicating that the first AS identifier and the second AS identifier are sibling ASes.

Case 3: A network device in a network obtains a first AS identifier and a second AS identifier.

In the scenario shown in FIG. 2, the network device may be network device 1, network device 2, network device 3, or network device 4 in FIG. 2.

Manners of obtaining the first AS identifier and the second AS identifier by the network device include but are not limited to the following two manners.

Manner 1: The network device obtains the configured first AS identifier and the configured second AS identifier, for example, receives the first AS identifier and the second AS identifier that are configured by an administrator through a network management system, a device management interface, or a command line, or in another manner, and configures the first AS identifier and the second AS identifier as sibling ASes.

Manner 2: The network device may obtain a correspondence sent by an RP server.

Optionally, when sending the first AS identifier and the second AS identifier to the network device, the RP server may send the first AS identifier and the second AS identifier information to the network device through an RPKI router protocol. A message sent by the RP server indicates that the first AS identifier and the second AS identifier are sibling ASes. That is, a manner in which the network device obtains the correspondence includes receiving the correspondence sent by the RP server. For specific details of the RPKI router protocol, refer to a definition in Request For Comments (RFC) 8210. All content of RFC 8210 is incorporated in this application by reference.

Figure 4:
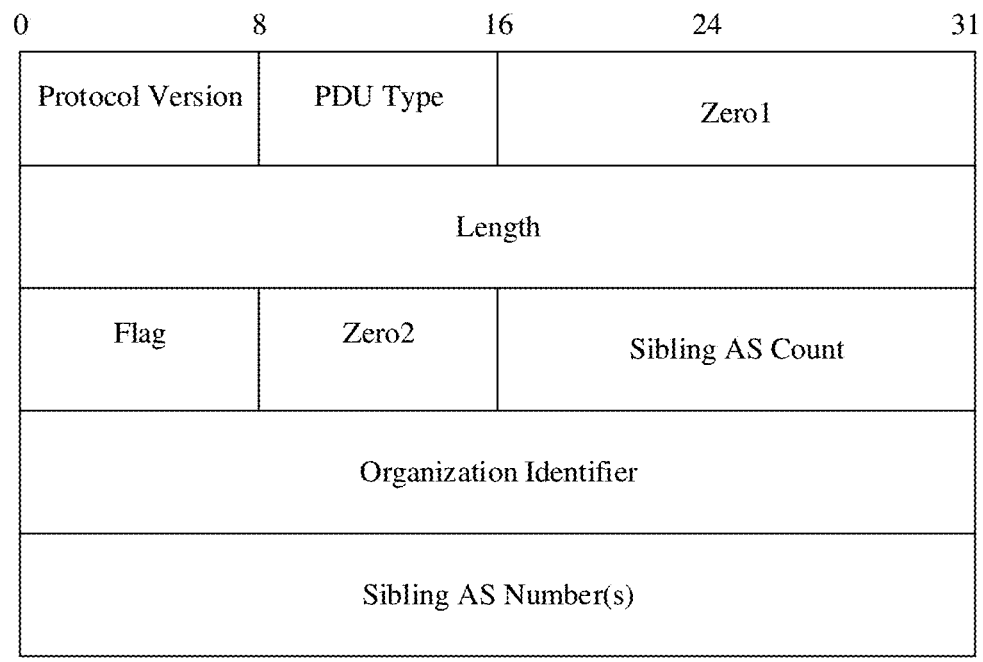
FIG. 4 is a schematic diagram of a protocol data unit format according to an embodiment of this application.

In an example, a sibling AS protocol data unit (PDU) may be defined for carrying the foregoing correspondence, and a format of the sibling AS PDU may be shown in FIG. 4.

Field definitions are as follows.

Protocol Version: indicates a protocol version number, and occupies 1 byte, where a value is a value to be officially allocated by a standards organization, and a currently allocated value is 2.

PDU Type: indicates a type of a protocol data unit, and occupies 1 byte, where a value is a value to be officially allocated by the standards organization, and a currently allocated value is 11.

zero1: indicates zero area 1, and may occupy 2 bytes and may be padded with 0.

Length: indicates a length field.

zero2: indicates zero area 2, and may occupy 1 byte and may be padded with 0.

Sibling AS count: indicates a quantity of sibling ASes encapsulated in the PDU, and may occupy 2 bytes.

Organization identifier: occupies 4 bytes.

Sibling Autonomous System Number(s): indicates one or more AS numbers, where the AS number is an AS identifier in embodiments of this application or this field may be understood as a sibling AS list, a quantity of AS numbers included in the sibling AS list is determined by the foregoing sibling AS count, and each AS number occupies 4 bytes.

The sibling AS PDU herein is only one of possible examples of a manner of carrying the correspondence, and a format may change, provided that information indicating that the first AS identifier and the second AS identifier are sibling ASes can be carried in a protocol packet.

Case 4: A route analysis device in a network obtains a first AS identifier and a second AS identifier.

Similarly, manners of obtaining the first AS identifier and the second AS identifier by the route analysis device include but are not limited to the following several manners.

Manner 1: Obtain the first AS identifier and the second AS identifier that are sent by the network device. In an example, the network device further sends an organization identifier corresponding to the first AS identifier and the second AS identifier. The route analysis device may determine, based on the obtained first AS identifier, second identifier, and organization identifier, that the first AS identifier and the second AS identifier are sibling ASes, and generate a correspondence indicating that the first AS identifier and the second AS identifier are the sibling ASes. In another example, a message sent by the network device includes a correspondence, where the correspondence indicates that the first AS identifier and the second AS identifier are sibling ASes, and the route analysis device obtains the correspondence from the message.

Manner 2: Obtain the first AS identifier and the second AS identifier that are sent by the RP server. In an example, the RP server further sends an organization identifier corresponding to the first AS identifier and the second AS identifier. The route analysis device may determine, based on the obtained first AS identifier, second identifier, and organization identifier, that the first AS identifier and the second AS identifier are sibling ASes, and generate a correspondence indicating that the first AS identifier and the second AS identifier are the sibling ASes. In another example, a message sent by the RP server includes a correspondence, where the correspondence indicates that the first AS identifier and the second AS identifier are sibling ASes, and the route analysis device obtains the correspondence from the message.

Manner 3: Obtain the first AS identifier and the second AS identifier that are sent by the TA. In an example, the TA further sends an organization identifier corresponding to the first AS identifier and the second AS identifier. The route analysis device may determine, based on the obtained first AS identifier, second identifier, and organization identifier, that the first AS identifier and the second AS identifier are sibling ASes, and generate a correspondence indicating that the first AS identifier and the second AS identifier are the sibling ASes. In another example, a message sent by the TA includes a correspondence, where the correspondence indicates that the first AS identifier and the second AS identifier are sibling ASes, and the route analysis device obtains the correspondence from the message.

Manner 4: Obtain a correspondence configured by the administrator, where the correspondence includes the first AS identifier and the second AS identifier.

Manner 5: Obtain a first AS identifier and a second AS identifier that are reported by a person of each organization, and generate a correspondence based on the obtained first AS identifier and second identifier, or obtain a correspondence from a reported message.

These manners are similar to content of related parts of obtaining the first AS identifier and the second AS identifier in the foregoing three cases. Details are not described herein again in this application.

In the foregoing, when there are a plurality of manners of obtaining the first AS identifier and the second AS identifier, the correspondence and more sibling AS information may also be obtained in a plurality of manners.

In an example, when the device receives a first AS identifier and a second AS identifier that are sent by a related device, the information may be encrypted information, and the device may obtain the first AS identifier and the second AS identifier in plaintext by performing an operation such as decryption.

Optionally, the first AS identifier and the second AS identifier are carried in a sibling AS list.

The device may obtain the first AS identifier and the second AS identifier by using one message, or may obtain the first AS identifier and the second AS identifier by using different messages. When the device obtains the first AS identifier and the second AS identifier by using a same message, the device may determine that the first AS identifier and the second AS identifier are sibling ASes when obtaining the first AS identifier or the second AS identifier. When the device obtains the first AS identifier and the second AS identifier by using different messages, the device may alternatively determine, based on other related information through analysis, that the first AS identifier and the second AS identifier are sibling ASes. For example, the other related information includes organization information corresponding to the first AS identifier and the second AS identifier is the same, or there is an inclusion relationship between route prefix information related to the first AS identifier and route prefix information related to the second AS identifier.

In correspondence to the foregoing cases, after obtaining the foregoing correspondence, the device may store the corresponding correspondence indicating that a first AS and a second AS are sibling ASes. Manners of generating the correspondence by the device in the foregoing case 1 to case 4 are similar. Only an example is provided herein for description. Details are not described for the cases one by one. In an example, the stored correspondence includes the first AS identifier and the second AS identifier. The correspondence may be referred to as a sibling AS dataset, which may be represented in the following Table 1.

TABLE 1

| Organization identifier (ID) | Sibling AS number (Number) |
|---|---|
| ID1 | AS11 AS12 AS13 |
| ID2 | AS21 AS22 |
| ID3 | AS31 AS32 AS33 AS34 |
| ... | ... |

As shown in the first row, an organization whose organization ID is ID1 includes three AS numbers: AS11, AS12, and AS13. The three ASes are sibling ASes. To be specific, the first AS identifier and the second AS identifier each may be either of the ASes. The AS number is a specific example of an AS identifier. As shown in the second row, an organization whose organization ID is ID2 includes two ASes: AS21 and AS22. The two ASes are sibling ASes. To be specific, the first AS identifier and the second AS identifier each may be either of the ASes. As shown in the third row, an organization whose organization ID is ID3 includes four ASes: AS31, AS32, AS33, and AS34. The four ASes are sibling ASes. To be specific, the first AS identifier and the second AS identifier each may be either of the ASes.

In the scenario shown in FIG. 2, a correspondence stored by network device 3 may be shown in Table 2.

TABLE 2

| Organization identifier | Sibling AS number(s) |
|---|---|
| ID1 | AS1 AS11 |

It indicates that AS1 and AS2 are sibling ASes of an organization whose ID number is ID1, where the first AS identifier may be AS1 or AS2, and the second AS identifier is any AS that is in the sibling AS list and that is different from the first AS identifier.

In another possible example, the correspondence stored by the device may alternatively be shown in Table 3 below.

TABLE 3

| Prefix/mask | Origin AS | Sibling AS number(s) |
|---|---|---|
| 10.132.0.0/17 | AS1 | AS11 |

It indicates that AS1 is an origin AS that advertises 10.132.0.0/17, and AS11 is a sibling AS of AS1. In this example, the message received by the device may further include the route prefix, or the device has obtained the route prefix and origin AS information.

In another possible example, the correspondence stored by the device may alternatively be shown in Table 4 and Table 5.

TABLE 4

| Organization identifier | AS number |
|---|---|
| ID1 | AS1 |

TABLE 5

| Organization identifier | AS number |
|---|---|
| ID1 | AS11 |

Table 4 indicates that an AS number corresponding to an organization with ID1 is AS1. Table 5 indicates that an AS number corresponding to an organization with ID1 is AS11. To be specific, the correspondence obtained by the device may be directly represented by using one table or in a specific form, or may be represented by using two or more tables or in any other form, provided that the device can determine, based on the correspondence, that two ASes are sibling ASes.

S305: Perform route management based on the correspondence.

After obtaining the correspondence between the sibling ASes, the device may perform route management based on the correspondence. That the device performs route management based on the correspondence includes the device performs direct route management or indirect route management.

In an example, that the device performs indirect route management may include after obtaining the correspondence, the device further sends the correspondence to another device, for example, the route analysis device, so that the device receiving the correspondence may perform direct route management, for example, route analysis, based on the correspondence. For example, network device 3 may send the correspondence obtained by network device 3 to the route analysis device, so that the route analysis device may perform route analysis based on the correspondence. Alternatively, the RP server may send the correspondence obtained by the RP server to network device 3, so that network device 3 may perform route message validation based on the correspondence.

In another example, that the device performs direct route management based on the correspondence may include performing route analysis based on the correspondence, to reduce cases such as incomplete analysis, or route hijacking or route leakage misjudgment caused by a lack of AS information on the device. The following describes a direct route management scenario with reference to S307 to S311.

S307: Obtain a route message, where the route message includes a route prefix and a third AS identifier.

Before performing S305, the device may perform S307 first.

In correspondence to the foregoing case 1 to case 4, manners of obtaining the route message by various devices are similar, which include but are not limited to one or more of receiving a route message sent by another device, for example, a network device, or obtaining one or more route messages imported and configured by an administrator. The obtained route message includes the route prefix and the third AS identifier. In an example, the route message is a BGP update message. After obtaining the route message, the device may store the route message for use or validation, or perform validation immediately after receiving the route message.

An execution sequence of S307 and S303 is not limited in this application. To be specific, the device may first obtain the first AS identifier and the second AS identifier, or may first obtain the route message.

In an example, that the device performs direct route management may include the following content, that is, S305 may include the following S309 and/or S311.

S309: Validate that the route message is invalid based on ROA or business relationship information.

The device may validate, based on obtained ROA information, whether the route prefix included in the route message is hijacked. In this scenario, the third AS identifier is an origin AS in the route message.

The ROA information obtained by the device also includes a route prefix. For ease of understanding, the route prefix in the route message obtained by the device is referred to as a first route prefix, and the route prefix in the ROA obtained by the device is referred to as a second route prefix. The first route prefix corresponds to the second route prefix, and each of these route prefixes includes a mask. That the two route prefixes correspond to each other may be understood as follows. Mask lengths of the first route prefix and the second route prefix are different. However, IP address ranges corresponding to the first route prefix and the second route prefix have an inclusion relationship. That is, the second route prefix may match the first route prefix using the longest match rule, or the first route prefix may match the second route prefix using the longest match rule.

Example A: In the route hijacking misjudgment scenario described in the foregoing related technology part, the device incorrectly validates, based on the ROA information, that route prefix 10.132.51.0/24 is hijacked by AS11.

The device may alternatively validate, based on the business relationship information, whether route leakage occurs on the route message. In this scenario, the third AS identifier is an AS that is in the route message and that is determined to have leaked a route. The route message further includes a fourth AS, where the fourth AS may be an origin AS in the route message, or may be an AS that is adjacent to the third AS identifier and that is after the third AS identifier.

The following describes, by using an example, a neighboring relationship and a sequence relationship between ASes. For example, an AS path is (AS1 AS11 AS2). In this case, it may be considered that AS1 is adjacent to AS11, and AS11 is adjacent to AS2, where AS1 is after AS11, and AS11 is after AS2. Herein, a sequence is defined based on a sequence of passing through the ASes announced by the route prefix. To be specific, in this example, an announcement path of the route prefix is as follows. The route prefix originates from AS2, is announced to AS11, and then is announced to AS1 via AS11.

Example B: In the route leakage misjudgment scenario described in the foregoing related technology part, the device incorrectly validates route prefix 10.132.51.0/24 based on the business relationship information. The AS path in the route message is (AS1 AS11 AS2), and the device validates that the route prefix is leaked by AS11 to AS1. That is, in this example, the third AS identifier is AS11, and the fourth AS is AS1.

Example C: It is assumed that the route prefix of the route message is 10.132.51.0/24, and an AS path in the route message is (AS1 AS2 AS11), where AS1 and AS11 belong to a same organization, and are sibling ASes. However, it is validated that the route prefix is leaked by AS2 to AS1.

Optionally, after validating that the route message is invalid, the device further changes a validation status of the route message to invalid.

S311: Validate whether the route message is valid based on the correspondence.

After the device receives the route message, after the device validates that the route message is invalid, or when route analysis needs to be performed, the device may validate whether the route message is valid based on the correspondence generated in step S305.

The device may perform this step after validating that the route message is invalid, or may perform this step without performing S309. In this case, the correspondence may be shown in Table 3, and the device may determine, based on a relationship between a route prefix and sibling ASes, that the route message is valid.

The following describes this step with reference to the examples in step S309.

In correspondence to Example A: The device may validate whether route prefix 10.132.51.0/24 is hijacked by AS11, and then determine that route hijacking does not occur and the route message is valid based on the origin AS of the route prefix is AS1 in the ROA, and the correspondence shown in FIG. 2 indicates that AS11 and AS1 are sibling ASes. That is, in the correspondence herein, the first AS identifier is AS11, the second AS identifier is AS1, the origin AS included in the ROA is the second AS identifier, namely, AS1, and the route prefix of the origin AS is 10.132.0.0/17. The third AS identifier in the route message is AS11. The device may determine, based on that the third AS identifier is the same as the first AS identifier, and that the first AS identifier and the second AS identifier are sibling ASes, that route hijacking does not occur and the route message is valid.

In correspondence to Example B: The device may validate whether route prefix 10.132.51.0/24 is leaked by AS11 to AS1, and then determine that route leakage does not occur and the route message is valid based on that the correspondence shown in Table 2 indicates that AS11 and AS1 are sibling ASes. That is, in the correspondence herein, the first AS identifier is AS11, and the second AS identifier is AS1. The third AS identifier included in the route message is AS11, and the fourth AS is AS1. The device may determine, based on that the fourth AS is the same as the second AS identifier, that the third AS identifier is the same as the first AS identifier, and that the first AS identifier and the second AS identifier are sibling ASes, that route leakage does not occur and the route message is valid.

Optionally, the third AS identifier may alternatively be an origin AS corresponding to the route prefix in the route message. That is, the route message may include only the third AS identifier and the fourth AS.

In correspondence to Example C: The device may validate whether route prefix 10.132.51.0/24 is leaked by AS2 to AS1, and then determine that route leakage does not occur and the route message is valid based on that the correspondence shown in Table 2 indicates that AS11 and AS1 are sibling ASes. That is, in the correspondence herein, the first AS identifier is AS11, and the second AS identifier is AS1. The third AS identifier included in the route message is AS11, and the fourth AS is AS1. The device may determine, based on that the fourth AS is the same as the second AS identifier, that the third AS identifier is the same as the first AS identifier, and that the first AS identifier and the second AS identifier are sibling ASes, that route leakage does not occur and the route message is valid.

In the foregoing, a manner in which the device validates the route message includes one or both of the two steps S309 and S311. To be specific, the device may first perform S309 and then perform S311, or may not perform S309 but perform S311, or in a process of performing S311, the device further validates the route message based on the ROA or the business relationship information.

Figure 3B:
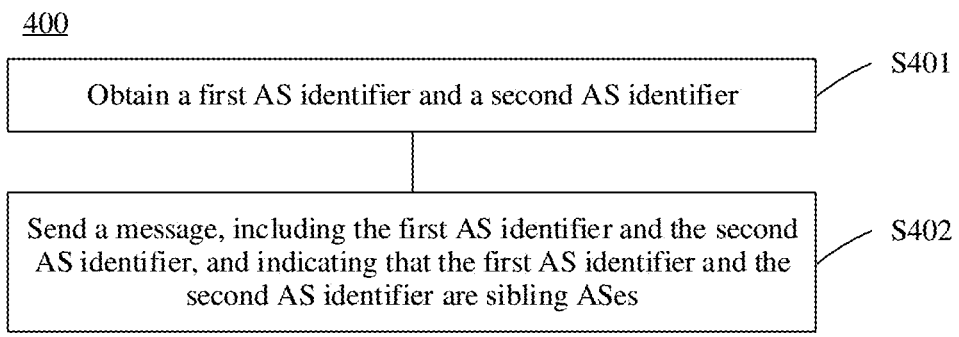
FIG. 3b is a schematic diagram of an AS management method according to an embodiment of this application.

The foregoing describes, by using an example, the route management method based on the technical solutions in embodiments of this application. FIG. 3b is a flowchart of an AS management method according to an embodiment of this application. A method embodiment 400 shown in FIG. 3b includes the following steps.

This method may be applied to an AS management device, and the route management device in the method embodiment 300 may alternatively be the AS management device. The AS management device may alternatively be the route management device in the method embodiment 300.

S401: Obtain a first AS identifier and a second AS identifier.

The AS management device obtains the first AS identifier and the second AS identifier, and determines that the first AS identifier and the second AS identifier are sibling ASes. For a manner of obtaining the first AS identifier and the second AS identifier by the AS management device, refer to related descriptions of obtaining the first AS identifier and the second AS identifier by the route management device in the method 300. Details are not described herein again in this application.

S402: Send a message, where the message includes the first AS identifier and the second AS identifier, and the message indicates that the first AS identifier and the second AS identifier are sibling ASes.

The AS management device sends the message to a receiving device, where the message includes the first AS identifier and the second AS identifier, and the message indicates that the first AS identifier and the second AS identifier are the sibling ASes. The message may be used by the receiving device to obtain a correspondence based on the message, so that the receiving device performs direct route management, such as route analysis, on a route message based on the message.

For detailed descriptions of a manner in which the AS management device sends the message indicating that the first AS identifier and the second AS identifier are the sibling ASes, refer to related descriptions in the method embodiment 300. Details are not described herein again.

Figure 5:
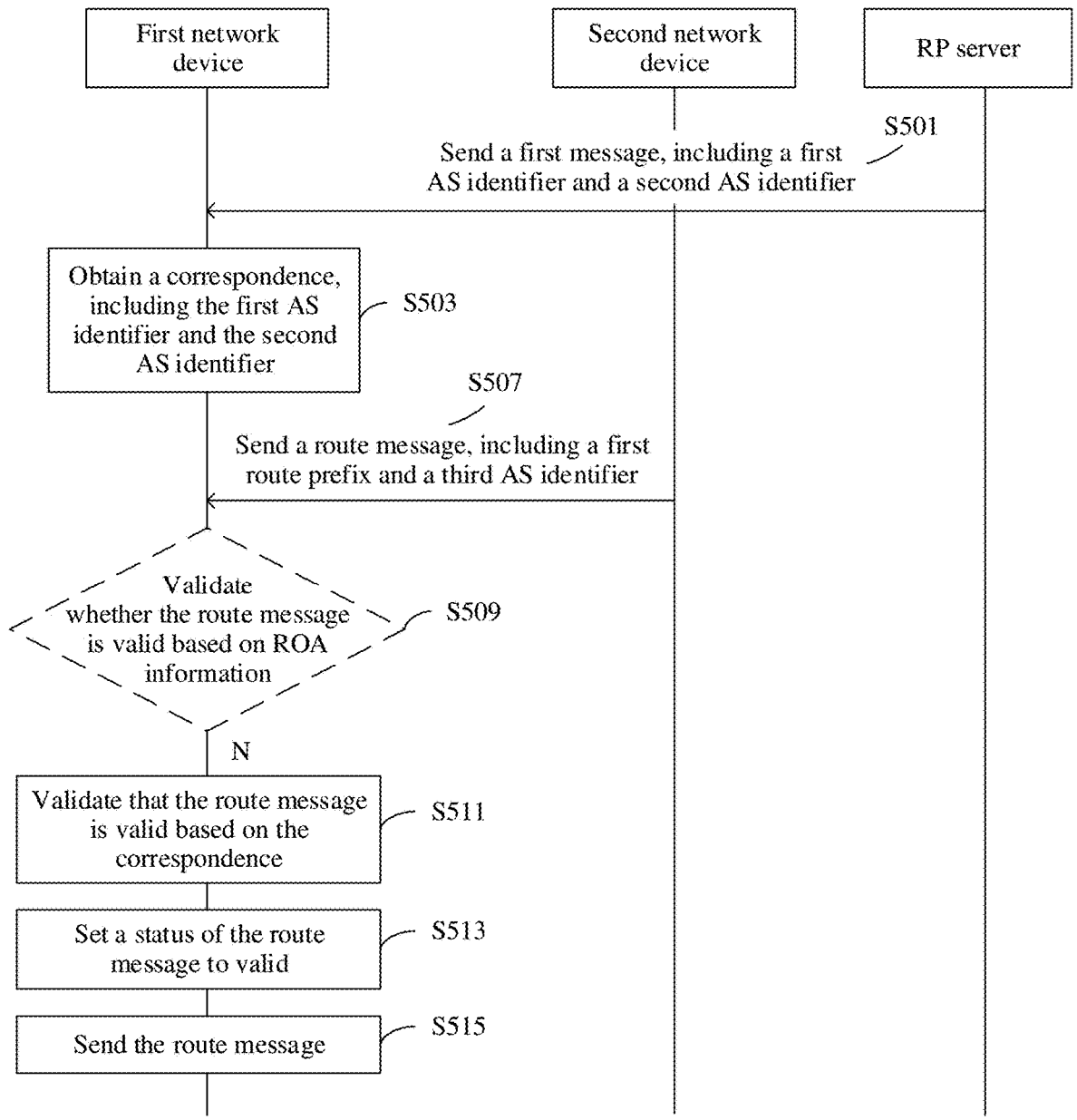
FIG. 5 is a schematic diagram of a method for preventing route hijacking misjudgment according to an embodiment of this application.

With reference to a flowchart of a route management method shown in FIG. 5, the following describes in detail that the methods in the foregoing method embodiment 300 and method embodiment 400 are applied to a scenario of preventing route hijacking misjudgment. A method embodiment 500 shown in FIG. 5 includes the following steps.

In this method embodiment, an example in which an RP server serves as an AS management device and a first network device serves as a route management device is used for description. It should be understood that the AS management device may be the RP server, the TA server, the network device, the route analysis device, or another device having an AS management function mentioned in the foregoing method embodiment 300, and the route management device may also be the RP server, the TA server, the network device, the route analysis device, or another device having a route management function mentioned in the foregoing method embodiment 300.

S501: The RP server sends a first message to the first network device, where the first message includes a first AS identifier and a second AS identifier.

In the scenario shown in FIG. 2, the method embodiment 500 is described by using an example in which network device 3 is the first network device and the RP server is the server herein.

The RP server sends the first message to network device 3 through the RPKI router protocol in the method embodiment 300 (which is referred to as the method 300 for short in the following) described in FIG. 3a. The first message may include a sibling AS PDU, and the PDU may further include information such as a sibling AS count and an organization identifier.

The first message indicates that the first AS identifier and the second AS identifier are sibling ASes.

S503: The first network device obtains a correspondence.

Network device 3 receives the first message, obtains the correspondence from the first message, and stores the correspondence, where the correspondence indicates that the first AS identifier and the second AS identifier are the sibling ASes.

For detailed descriptions of steps S501 and S503, refer to related descriptions of step S303 in the method 300. Details are not described herein again.

S507: A second network device sends a route message to the first network device, where the route message includes a first route prefix and a third AS identifier.

Accordingly, the first network device receives the route message sent by the second network device.

In the scenario shown in FIG. 2, the second network device may be network device 1. In this case, network device 3 may receive the route message sent by network device 1, and the route message may be a BGP update message. In the update message, the route prefix may be 10.132.51.0/24, and an AS path in the update message may be (AS1 AS11). The route message indicates that AS11 is an origin AS of 10.132.51.0/24, and is announced to AS1 via network device 2, and then to network device 3 via network device 1. In this example, the third AS identifier is AS11.

S509: The first network device validates, based on obtained ROA information, whether the route message is valid. If the route message is invalid, step S511 is performed.

This step is an optional step. For detailed descriptions about how network device 3 obtains the ROA information and how network device 3 validates, based on the obtained ROA information, that the route message is invalid, refer to the descriptions in step S309 in the foregoing method 300. Details are not described herein again.

Optionally, after validating that the route message is invalid, network device 3 may set a validation status of route information corresponding to the route message to invalid. In related technologies, if the following steps S511, S513, and the like do not exist, network device 3 may reduce a priority of the route message based on that the validation status is invalid, and then does not announce the route. Alternatively, network device 3 may announce the route to a device such as a BGP peer of network device 3. When announcing the route, network device 3 sets an attribute of the route, for example, an original route attribute, to invalid.

S511: The first network device determines, based on the correspondence, that the route message is valid.

For how network device 3 determines, based on the correspondence, that the route message is valid, refer to related descriptions of step S311 in the method 300. Details are not described herein again in this application.

S513: The first network device sets the status of the route message to valid.

Network device 3 may set the validation status of the route information to invalid in S309, and then set the validation status of the route information to valid in this step.

If network device 3 needs to announce the route information to the peer of network device 3, network device 3 may set a status of a related attribute part in the route message that announces the route information to valid.

S515: The first network device sends the route message to a third network device.

Optionally, when network device 3 further needs to announce the route information corresponding to the route message to the peer of network device 3, network device 3 may send the route message, namely, the route information corresponding to the route message, to the peer of network device 3, for example, network device 4 in FIG. 2.

The foregoing mainly describes embodiments of this application by using an AS identifier as an example. It should be understood that this solution may also be applied to another similar or related scenario, for example, another non-BGP autonomous system scenario, or another existing or future domain-based management scenario.

Figure 6:
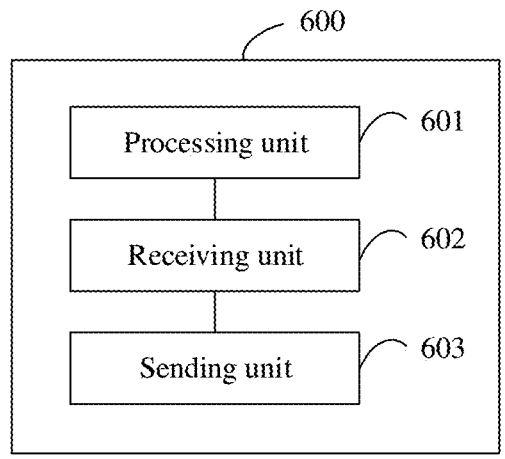
FIG. 6 is a schematic diagram of a structure of a route management apparatus according to an embodiment of this application.

FIG. 6 is a schematic diagram of a structure of a route management apparatus 600 according to an embodiment of this application. The apparatus 600 has any function of the route management device in the method 300 or the first network device in the method 500. As shown in FIG. 6, the apparatus 600 includes a processing unit 601, configured to perform S303, S305, S509, S511, S513, or the like. Optionally, the apparatus 600 further includes a receiving unit 602 and a sending unit 603. The receiving unit 602 is configured to perform a related step of receiving the first AS identifier and the second AS identifier or a related step of receiving the route message in S303 and S503. The sending unit 603 is configured to perform S515.

The route management apparatus 600 corresponds to the route management device in the foregoing method embodiments, for example, the first network device. Modules in the route management apparatus 600 and the foregoing other operations and/or functions are respectively intended to implement various steps and methods implemented by the route management device in the method embodiments. For specific details, refer to the foregoing method 300 or method 500. For brevity, details are not described herein again.

When the route management apparatus 600 performs route management, division into the foregoing functional modules is only used as an example for description. During actual application, the foregoing functions may be allocated to different functional modules for implementation based on a requirement, in other words, an internal structure of the route management apparatus 600 is divided into different functional modules, to complete all or a part of the functions described above.

Figure 7:
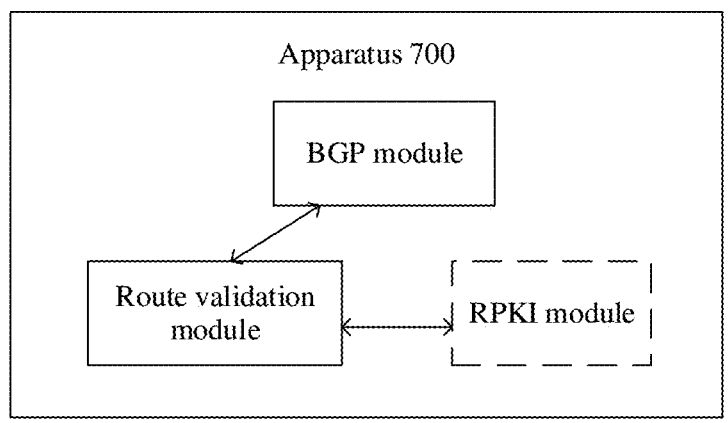
FIG. 7 is a schematic diagram of a structure of a route management apparatus according to an embodiment of this application.

FIG. 7 is a schematic diagram of a structure of a route management apparatus 700 according to an embodiment of this application. The apparatus 700 has any function of the route management device in the method 300 or the first network device in the method 500. The apparatus 700 includes a BGP module, a route validation module, and an RPKI module. The RPKI module may be configured to perform a related step of receiving the first AS identifier and the second AS identifier or a related step of receiving the route message and a corresponding step of obtaining the correspondence in S303 and S503. The route validation module may be configured to perform S305, S509, S511, S513, or the like. The BGP module may be configured to perform steps such as S507 and S515. The apparatus 700 corresponds to the apparatus 600. In this case, it may be considered that the receiving unit 602 and the sending unit 603 of the apparatus 60o may include the BGP module and the RPKI module of the apparatus 700, the BGP module and the RPKI module of the apparatus 700 may have a receiving and sending function, and the processing unit 601 of the apparatus 60o may include the route validation module of the apparatus 700. The apparatus 700 is another apparatus division manner for the route management device and the first network device in the foregoing method embodiments. Modules in the route management apparatus 700 and the foregoing other operations and/or functions are respectively intended to implement various steps and methods implemented by the route management device in the method embodiments. For specific details, refer to the foregoing method 300 or method 500. For brevity, details are not described herein again.

Figure 8:
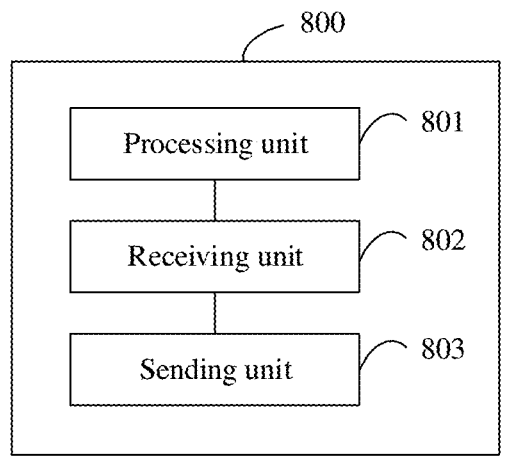
FIG. 8 is a schematic diagram of a structure of an AS management apparatus according to an embodiment of this application.

FIG. 8 is a schematic diagram of a structure of an AS management apparatus 800 according to an embodiment of this application. The apparatus 800 has any function of the AS management device in the method 400 or the RP server in the method 500. As shown in FIG. 8, the apparatus 80o includes a processing unit 801 and a sending unit 803. The processing unit 801 is configured to perform a related step of obtaining the first AS identifier and the second AS identifier in S401. The sending unit 803 is configured to perform S402 or S501. Optionally, the apparatus 800 further includes a receiving unit 802, configured to receive a first AS identifier and a second AS identifier that are sent by another device.

The apparatus 800 corresponds to the AS management device, such as the RP server, in the foregoing method embodiment 400 and method embodiment 500. Modules in the apparatus 800 and the foregoing other operations and/or functions are respectively intended to implement various steps and methods implemented by the AS management device in the method embodiments. For specific details, refer to the foregoing method 400 or method 500. For brevity, details are not described herein again.

When the apparatus 800 performs AS management, division into the foregoing functional modules is only used as an example for description. During actual application, the foregoing functions may be allocated to different functional modules for implementation based on a requirement, in other words, an internal structure of the apparatus 800 is divided into different functional modules, to complete all or a part of the functions described above. In addition, the apparatus 800 provided in the foregoing embodiment and the method 400 or the method 500 are based on a same idea. For a specific implementation process of the apparatus 800, refer to the method 400 or the method 500. Details are not described herein again.

In correspondence to the method embodiments and the virtual apparatus embodiments provided in this application, an embodiment of this application further provides a network device. The following describes a hardware structure of the network device.

A network device 900 or a network device 1000 described in the following corresponds to the route management device or the AS management device in the foregoing method embodiments. Hardware, modules, and the foregoing other operations and/or functions in the network device 900 or the network device 1000 are respectively intended to implement various steps and methods implemented by the network device 900 or the network device 1000 in the method embodiments. For a detailed procedure of how the network device 900 or the network device 100 implements AS management or route management based on sibling ASes, refer to the foregoing method embodiments. For brevity, details are not described herein again. The steps of the method 300, the method 400, or the method 500 are implemented by using an integrated logic circuit of hardware in a processor of the network device 900 or the network device 1000, or by using instructions in a form of software. The steps of the methods disclosed with reference to embodiments of this application may be performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor. To avoid repetition, details are not described herein again.

The network device 900 or the network device 1000 corresponds to the apparatus 600, the apparatus 700, or the apparatus 800 in the foregoing virtual apparatus embodiments. Each functional module in the apparatus 600, the apparatus 700, or the apparatus 800 is implemented by using software of the network device 900 or the network device 1000. In other words, the functional module included in the apparatus 600, the apparatus 700, or the apparatus 800 is generated after the processor of the network device 900 or the network device moo reads program code stored in a memory.

Figure 9:
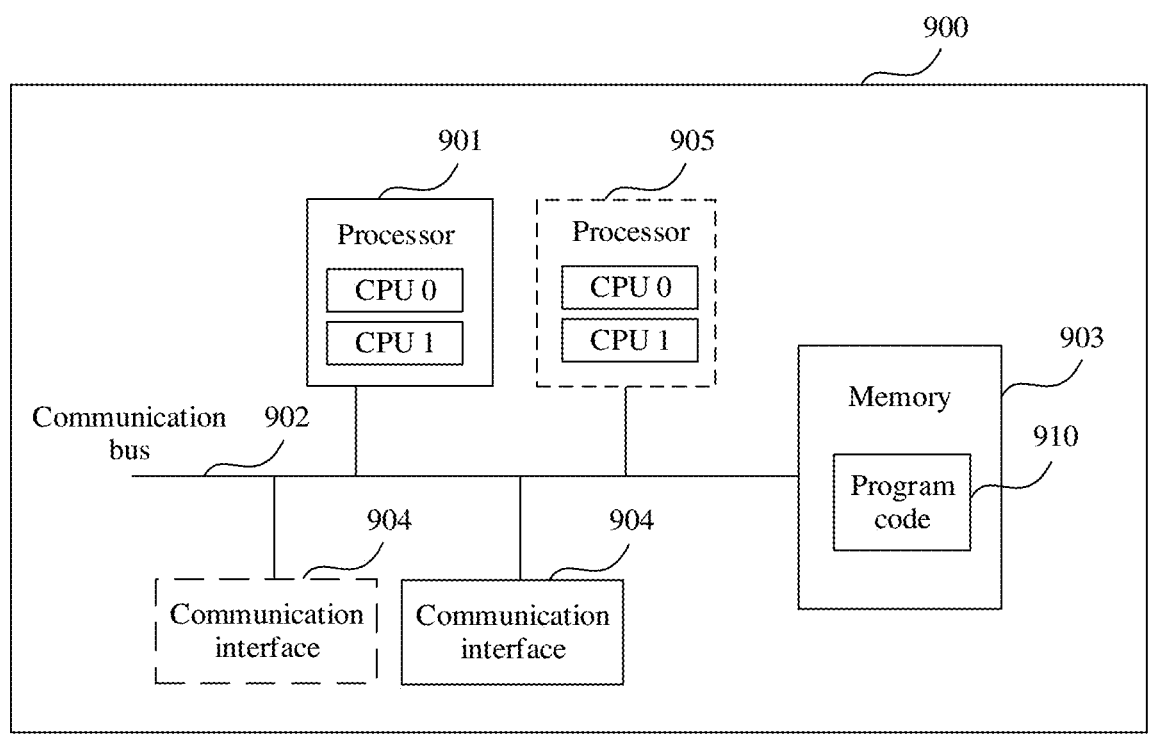
FIG. 9 is a schematic diagram of a structure of a network device according to an embodiment of this application.

FIG. 9 is a schematic diagram of a structure of the network device 900 according to an example embodiment of this application. The network device 900 may be configured as a route management device or an AS management network device. The network device 900 may be implemented by using a general bus architecture.

The network device 900 includes at least one processor 901, a communication bus 902, a memory 903, and at least one communication interface 904.

The processor 901 may be a general-purpose central processing unit (CPU), a network processor (NP), a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The communication bus 902 is configured to transfer information between the foregoing components. The communication bus 902 may be classified into an address bus, a data bus, a control bus, and the like. For ease of representation, only one thick line is used to represent the bus in the figure, but this does not mean that there is only one bus or only one type of bus.

The memory 903 may be a read-only memory (ROM) or another type of static storage device capable of storing static information and instructions, or may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of an instruction or a data structure and capable of being accessed by a computer. This is not limited thereto. The memory 903 may exist independently, and is connected to the processor 901 through the communication bus 902. Alternatively, the memory 903 may be integrated with the processor 901.

The communication interface 904 uses any apparatus such as a transceiver, and is configured to communicate with another device or a communication network. The communication interface 904 includes a wired communication interface, and may include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

During specific implementation, in an embodiment, the processor 901 may include one or more CPUs, for example, a CPU 0 and a CPU 1 in FIG. 9.

During specific implementation, in an embodiment, the network device 900 may include a plurality of processors, for example, the processor 901 and a processor 905 shown in FIG. 9. Each of the processors may be a single-core processor (single-CPU) or may be a multi-core processor (multi-CPU). The processor herein may refer to one or more devices, circuits, and/or processing cores configured to process data (for example, computer program instructions).

During specific implementation, in an embodiment, the network device 900 may further include an output device 906 and an input device 907. The output device 906 communicates with the processor 901, and may display information in a plurality of manners. For example, the output device 906 may be a liquid crystal display (LCD), a light emitting diode (LED) display device, a cathode ray tube (CRT) display device, or a projector. The input device 907 communicates with the processor 901, and may receive a user input in a plurality of manners. For example, the input device 907 may be a mouse, a keyboard, a touchscreen device, a sensing device, or the like.

In some embodiments, the memory 903 is configured to store program code 910 for performing the solutions in this application, and the processor 901 can execute the program code 910 stored in the memory 903. In other words, the network device 900 may implement, by using the processor 901 and the program code 910 in the memory 903, the method 300, the method 400, or the method 500 provided in the method embodiments.

The network device 900 in this embodiment of this application may correspond to the route management device or the AS management device in the foregoing method embodiments. In addition, the processor 901, the communication interface 904, and the like in the network device 900 may implement functions of the devices and/or various steps and methods implemented by the devices in the foregoing method embodiments. For brevity, details are not described herein again.

The receiving unit 602 and the sending unit 603 in the apparatus 600 may be equivalent to the communication interface 904 in the network device 900. The processing unit 601 in the apparatus 600 may be equivalent to the processor 901 in the network device 900.

The receiving unit 802 and the sending unit 803 in the apparatus 800 may be equivalent to the communication interface 904 in the network device 900. The processing unit 801 in the apparatus 800 may be equivalent to the processor 901 in the network device 900.

Figure 10:
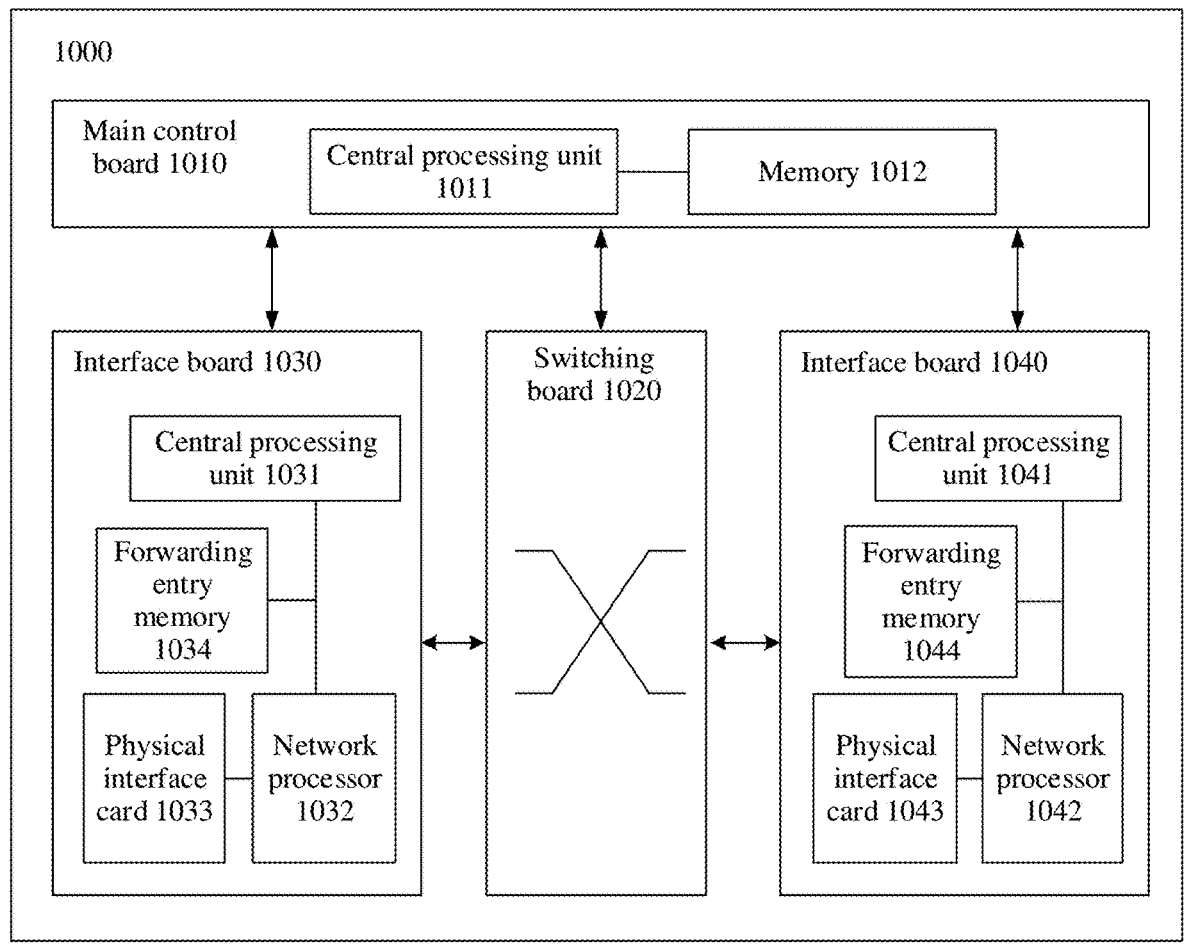
FIG. 10 is a schematic diagram of a structure of a network device according to an embodiment of this application.

FIG. 10 is a schematic diagram of a structure of the network device 1000 according to an example embodiment of this application. The network device 1000 may be configured as a route management device or an AS management device. The network device 1000 includes a main control board 1010 and an interface board 1030.

The main control board 1010 is also referred to as a main processing unit (MPU) or a route processor card. The main control board 1010 is configured to control and manage components in the network device 1000, including functions such as route computation, device management, device maintenance, and protocol processing. The main control board 1010 includes a central processing unit 1011 and a memory 1012.

The interface board 1030 is also referred to as a line processing unit (line processing unit, LPU) card, a line card (line card), or a service board. The interface board 1030 is configured to provide various service interfaces and forward a data packet. The service interface includes but is not limited to an Ethernet interface, a POS (Packet over SONET/SDH) interface, and the like. The Ethernet interface is, for example, a flexible Ethernet service interface (Flexible Ethernet Clients, FlexE Clients). The interface board 1030 includes a central processing unit 1031, a network processor 1032, a forwarding entry memory 1034, and a physical interface card (PIC) 1033.

The central processing unit 1031 on the interface board 1030 is configured to control and manage the interface board 1030, and communicate with the central processing unit 1011 on the main control board 1010.

The network processor 1032 is configured to forward a packet. A form of the network processor 1032 may be a forwarding chip. Specifically, the network processor 1032 is configured to forward a received packet based on a forwarding table stored in the forwarding entry memory 1034. If a destination address of the packet is an address of the network device 1000, the network processor 1032 sends the packet to a CPU (for example, the central processing unit ion) for processing. If a destination address of the packet is not an address of the network device 1000, the network processor 1032 searches for, based on the destination address, a next hop and an outbound interface corresponding to the destination address in the forwarding table, and forwards the packet to the outbound interface corresponding to the destination address. Processing an uplink packet includes a packet is processed on an inbound interface, and the forwarding table is searched. Processing a downlink packet includes the forwarding table is searched.

The physical interface card 1033 is configured to implement a physical layer interconnection function. Original traffic enters the interface board 1030 from the physical interface card 1033, and a processed packet is sent out from the physical interface card 1033. The physical interface card 1033, also referred to as a subcard, may be mounted on the interface board 1030, and is responsible for converting an optical/electrical signal into a packet, performing validity check on the packet, and forwarding the packet to the network processor 1032 for processing. In some embodiments, the central processing unit may alternatively perform a function of the network processor 1032, for example, implement software forwarding based on a general CPU. Therefore, the network processor 1032 is not necessary in the physical interface card 1033.

Optionally, the network device 1000 includes a plurality of interface boards. For example, the network device 1000 further includes an interface board 1040, and the interface board 1040 includes a central processing unit 1041, a network processor 1042, a forwarding entry memory 1044, and a physical interface card 1043.

Optionally, the network device 1000 further includes a switching board 1020. The switching board 1020 may also be referred to as a switch fabric unit (SFU). When the network device includes a plurality of interface boards 1030, the switching board 1020 is configured to complete data exchange between the interface boards. For example, the interface board 1030 and the interface board 1040 may communicate with each other via the switching board 1020.

The main control board 1010 is coupled to the interface board 1030. For example, the main control board 1010, the interface board 1030, the interface board 1040, and the switching board 1020 are connected to a system backboard through a system bus. In this way, interworking is implemented. In a possible implementation, an inter-process communication (IPC) channel is established between the main control board 1010 and the interface board 1030, and the main control board 1010 communicates with the interface board 1030 through the IPC channel.

Logically, the network device 1000 includes a control plane and a forwarding plane. The control plane includes the main control board 1010 and the central processing unit 1031. The forwarding plane includes components that perform forwarding, such as the forwarding entry memory 1034, the physical interface card 1033, and the network processor 1032. The control plane performs functions such as routing, generating a forwarding table, processing signaling and a protocol packet, and configuring and maintaining a device status. The control plane delivers the generated forwarding table to the forwarding plane. On the forwarding plane, based on the forwarding table delivered from the control plane, the network processor 1032 looks up the table, and forwards a packet received by the physical interface card 1033. The forwarding table delivered by the control plane may be stored in the forwarding entry memory 1034. In some embodiments, the control plane and the forwarding plane may be completely separated, and are not on a same device.

If the network device 1000 is configured as the route management device, the physical interface card 1033 receives a message carrying a first AS identifier and a second AS identifier, and sends the message to the network processor 1032. The network processor 1032 obtains information such as a correspondence based on the message, and after processing a route message based on the correspondence, sends the route message via the physical interface card 1033.

If the network device 1000 is configured as the AS management device, the physical interface card 1033 receives a first AS identifier and a second AS identifier, and sends the first AS identifier and the second AS identifier to the network processor 1032. The network processor 1032 determines that the first AS identifier and the second AS identifier are sibling ASes, generates a message, and sends the message to a route management device via the physical interface card 1033.

The receiving unit 602 and the sending unit 603 in the apparatus 600 are equivalent to the physical interface card 1033 in the network device 1000. The processing unit 601 in the apparatus 600 may be equivalent to the network processor 1032 or the central processing unit 1011.

The receiving unit 802 and the sending unit 803 in the apparatus 800 are equivalent to the physical interface card 1033 in the network device 1000. The processing unit 801 in the apparatus 800 may be equivalent to the network processor 1032 or the central processing unit 1011.

Operations performed on the interface board 1040 are consistent with the operations performed on the interface board 1030 in this embodiment of this application. For brevity, details are not described. The network device 1000 in this embodiment may correspond to the route management device or the AS management device in the foregoing method embodiments. The main control board 1010 and the interface board 1030 and/or the interface board 1040 in the network device 1000 may implement the functions and/or various steps implemented by the route management device or the AS management device in the foregoing method embodiments. For brevity, details are not described herein again.

It should be noted that, there may be one or more main control boards. When there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a weak data exchange and processing capability. A specific architecture that is to be used depends on a specific networking and deployment scenario. This is not limited herein.

In some possible embodiments, the route management device or the AS management device may be implemented as a virtualized device.

For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine may be configured as a first network device or a second network device. For example, the route management device or the AS management device may be implemented based on a general-purpose physical server in combination with a network functions virtualization (NFV) technology. The route management device or the AS management device is a virtual host, a virtual router, or a virtual switch. After reading this application, with reference to the NFV technology, a person skilled in the art may virtualize, on the general-purpose physical server, the route management device or the AS management device having the foregoing functions. Details are not described herein.

For example, the virtualized device may be a container, and the container is an entity configured to provide an isolated virtualized environment. For example, the container may be a docker container. The container may be configured as the route management device or the AS management device. For example, the route management device or the AS management device may be created by using a corresponding image. For example, two container instances, namely, a container instance proxy-container 1 and a container instance proxy-container 2, may be created for a proxy-container (which is a container that provides a proxy service) by using an image of the proxy-container. The container instance proxy-container 1 is provided as the route management device, and the container instance proxy-container 2 is provided as the AS management device. When the container technology is used for implementation, the route management device or the AS management device may operate by using a kernel of a physical machine, and a plurality of route management devices or AS management devices may share an operating system of the physical machine. Different route management devices or AS management devices may be isolated by using the container technology. The containerized route management device or AS management device may operate in a virtualized environment, for example, may operate in a virtual machine. The containerized route management device or AS management device may directly operate in a physical machine.

For example, the virtualized device may be a pod. The pod is a basic unit of Kubernetes (where Kubernetes is an open-source container orchestration engine of Google, and is briefly referred to as K8s in English) for deploying, managing, and orchestrating a containerized application. The pod may include one or more containers. All containers in a same pod are usually deployed on a same host. Therefore, all the containers in the same pod may communicate with each other via the host, and may share storage resources and network resources of the host. A pod may be configured as a route management device or an AS management device. For example, specifically, a container as a service (CaaS, a container-based platform a a service (PaaS) service) may be instructed to create a pod, and the pod is provided as the route management device or the AS management device.

Certainly, the route management device or the AS management device may alternatively be another virtualized device, which is not enumerated one by one herein.

In some possible embodiments, the route management device or the AS management device may alternatively be implemented by a general-purpose processor. For example, the general-purpose processor may be in a form of a chip. Specifically, the general-purpose processor that implements the route management device or the AS management device includes a processing circuit, and an input interface and an output interface that are internally connected to and communicate with the processing circuit. The processing circuit is configured to perform a packet generation step in the foregoing method embodiments through the input interface, perform a receiving step in the foregoing method embodiments through the input interface, and perform a sending step in the foregoing method embodiments through the output interface. Optionally, the general-purpose processor may further include a storage medium. The processing circuit is configured to perform a storing step in the foregoing method embodiments via the storage medium. The storage medium may store instructions to be executed by the processing circuit. The processing circuit is configured to execute the instructions stored in the storage medium, to perform the foregoing method embodiments.

Figure 11:
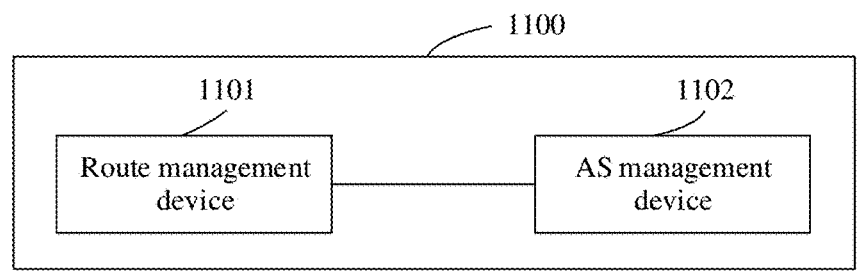
FIG. 11 is a schematic diagram of a structure of a route management system according to an embodiment of this application.

Refer to FIG. 11. An embodiment of this application provides a network system 1100. The system 1100 includes a route management device 1101 and/or an AS management device 1102. Optionally, the route management device 1101 is, for example, the apparatus 600, the apparatus 700, the network device 900, or the network device 1000, and the AS management device 1102 is, for example, the apparatus 800, the network device 900, or the network device 1000.

An embodiment of this application provides a computer program product. When the computer program product runs on a route management device or an AS management device, the route management device or the AS management device performs the method 300, the method 400, or the method 500 in the foregoing method embodiments.

The apparatuses in the foregoing product forms separately have any function of the route management device or the AS management device in the foregoing method embodiments. Details are not described herein again.

A person of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. All or a part of the units may be selected based on actual requirements to achieve the objectives of the solutions of embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in a form of a software product. The computer software product is stored in a storage medium and includes several instructions for indicating a computer device (which may be a personal computer, a server, a network device, or the like) to perform all or a part of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

All or a part of the foregoing embodiments may be implemented by using software, hardware, firmware, or any combination thereof. When software is used to implement embodiments, all or a part of the embodiments may be implemented in a form of a computer program product. The computer program product includes one or more computer program instructions. When the computer program instructions are loaded and executed on a computer, all or a part of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art may understand that all or a part of the steps of embodiments may be implemented by hardware or a program instructing related hardware. The program may be stored in a computer-readable storage medium. The storage medium may include a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A method, comprising:
   obtaining a correspondence, wherein the correspondence comprises a first autonomous system (AS) identifier and a second AS identifier, and wherein the correspondence indicates that the first AS identifier and the second AS identifier are sibling ASes; and
   performing route management based on the correspondence,
   wherein obtaining the correspondence comprises receiving a first message that comprises the correspondence, and
   wherein the first message further comprises an organization identifier and a sibling AS list, the sibling AS list including a plurality of AS identifiers managed by an organization indicated by the organization identifier.

2. The method according to claim 1, wherein the performing route management based on the correspondence comprises:
   determining that a route message is valid based on the correspondence.

3. The method according to claim 2, further comprising performing, before the determining that the route message is valid based on the correspondence, at least one of:
   determining that the route message is invalid based on route origination authorization (ROA) information, wherein the route message being invalid comprises a route of the route message being hijacked; or
   determining that the route message is invalid based on business relationship information, wherein the route message being invalid comprises route leakage occurring on the route message.

4. The method according to claim 3, wherein the route message comprises a first route prefix and a third AS identifier, and wherein the route message indicates that a third AS is an origin AS of the first route prefix; and
   wherein determining that the route message is invalid based on ROA information comprises:
      determining, based on the ROA information, that the first route prefix is hijacked by the third AS, wherein the ROA information indicates that an origin AS of a second route prefix is a second AS, and the first route prefix corresponds to the second route prefix; and
   wherein determining that the route message is valid based on the correspondence comprises:
      determining, in response to the third AS identifier being the same as the first AS identifier, that the route message is not hijacked by the third AS identifier.

5. The method according to claim 3, wherein the route message comprises a first route prefix, a third AS identifier, and a fourth AS identifier, and wherein the third AS identifier is adjacent to the fourth AS identifier on an AS path of the route message;

wherein determining that the route message is invalid based on business relationship information comprises:
validating that the first route prefix is leaked by a third AS to a fourth AS; and
wherein determining that the route message is valid based on the correspondence comprises:
determining, based on the fourth AS identifier being the same as the first AS identifier and further based on a first condition being met, that the route message is not leaked by the third AS, wherein the first condition comprises at least one of the third AS identifier being the same as the second AS identifier, or an origin AS identifier in the route message being the same as the second AS identifier.

6. The method according to claim 2, further comprising performing, after the determining that the route message is valid:
updating a validation status corresponding to the route message to valid.

7. The method according to claim 2, wherein the route message is a border gateway protocol (BGP) message.

8. The method according to claim 1, wherein the first message is sent by a resource public key infrastructure (RPKI) server, wherein the first message comprises a sibling AS protocol data unit (PDU), and wherein the PDU comprises the first AS identifier and the second AS identifier.

9. The method according to claim 1, wherein the method is applied to a resource public key infrastructure (RPKI) system.

10. An apparatus, comprising:
at least one processor;
at least one non-transitory computer-readable storage medium storing a program to be executed by the at least one processor, the program including instructions to:
obtain a correspondence, wherein the correspondence comprises a first autonomous system (AS) identifier and a second AS identifier, and the correspondence indicates that the first AS identifier and the second AS identifier are sibling ASes; and
perform route management based on the correspondence,
wherein the correspondence is obtained by receipt of a first message that comprises the correspondence, and
wherein the first message further comprises an organization identifier and a sibling AS list, the sibling AS list including a plurality of AS identifiers managed by an organization indicated by the organization identifier.

11. The apparatus according to claim 10, wherein the instructions further include instructions to:
determine that a route message is valid based on the correspondence.

12. The apparatus according to claim 11, wherein the instructions further include instructions to perform at least one of:
determine that the route message is invalid based on route origination authorization (ROA) information, wherein that the route message being invalid comprises a route of the route message being hijacked; or
determine that the route message is invalid based on business relationship information, wherein that the route message being invalid comprises route leakage occurring on the route message.

13. The apparatus according to claim 12, wherein the route message comprises a first route prefix and a third AS identifier, and wherein the route message indicates that a third AS is an origin AS of the first route prefix; and
wherein the instructions further include instructions to:
determine, based on the ROA information, that the first route prefix is hijacked by the third AS, wherein the ROA information indicates that an origin AS of a second route prefix is a second AS, and wherein the first route prefix corresponds to the second route prefix; and
determine, in response to the third AS identifier being the same as the first AS identifier, that the route message is not hijacked by the third AS identifier.

14. The apparatus according to claim 12, wherein the route message comprises a first route prefix, a third AS identifier, and a fourth AS identifier, and wherein the third AS identifier is adjacent to the fourth AS identifier on an AS path of the route message;
wherein the instructions further include instructions to:
determine that the first route prefix is leaked by a third AS to a fourth AS; and
determine, based on that the fourth AS identifier being the same as the first AS identifier and further based on a first condition being met, that the route message is not leaked by the third AS, wherein the first condition comprises at least one of the third AS identifier being the same as the second AS identifier, or an origin AS identifier in the route message being the same as the second AS identifier.

15. The apparatus according to claim 10, wherein the first message is sent by a resource public key infrastructure (RPKI) server, wherein the first message further comprises a sibling AS protocol data unit (PDU), and wherein the PDU comprises the first AS identifier and the second AS identifier.

16. A non-transitory storage medium storing a program for execution by one or more processors connected to an apparatus, wherein the program includes instructions to cause the apparatus to perform:
obtaining a correspondence, wherein the correspondence comprises a first autonomous system (AS) identifier and a second AS identifier, and wherein the correspondence indicates that the first AS identifier and the second AS identifier are sibling ASes; and
performing route management based on the correspondence,
wherein obtaining the correspondence comprises receiving a first message that comprises the correspondence, and
wherein the first message further comprises an organization identifier and a sibling AS list, the sibling AS list including a plurality of AS identifiers managed by an organization indicated by the organization identifier.

17. The non-transitory storage medium according to claim 16, wherein the program further includes instructions for:
determining that a route message is valid based on the correspondence.

18. The non-transitory storage medium according to claim 17, wherein the program further includes instructions for performing at least one of:
determining that the route message is invalid based on route origination authorization (ROA) information, wherein the route message being invalid comprises a route of the route message being hijacked; or
determining that the route message is invalid based on business relationship information, wherein the route message being invalid comprises route leakage occurring on the route message.

19. The non-transitory storage medium according to claim 17, wherein the route message is a border gateway protocol (BGP) message.

20. The non-transitory storage medium according to claim 16, wherein the first message is sent by a resource public key infrastructure (RPKI) server, wherein the first message further comprises a sibling AS protocol data unit (PDU), and wherein the PDU comprises the first AS identifier and the second AS identifier.

* * * * *